United States Patent [19] [11] 4,335,944
Marshall [45] Jun. 22, 1982

[54] APPARATUS FOR UNDERWATER IMAGE-RECORDING AS BY SONAR-TRIGGERED ELAPSED TIME STROBE PHOTOGRAPHY AND THE LIKE

[76] Inventor: Duane Marshall, 9 Hadley Rd., Lexington, Mass. 02173

[21] Appl. No.: 171,373

[22] Filed: Jul. 23, 1980

[51] Int. Cl.³ ............. G03B 17/08; G03B 17/36; G03B 15/04; G03B 9/52
[52] U.S. Cl. ................................ 354/64; 354/129; 354/173; 354/217; 354/266; 367/96; 367/131
[58] Field of Search ........... 354/64, 126, 129, 217, 354/173, 289, 266, 268; 367/96, 131, 133; 352/174, 169, 170, 171; 346/107 R, 107 A

[56] References Cited
U.S. PATENT DOCUMENTS 3,404,614 10/1968 Naumann ............... 354/217 X
3,893,136 7/1975 Ando et al. ............. 354/173
4,096,500 6/1978 Lermann et al. ........ 352/169
4,105,990 4/1978 Rines et al. ............. 367/96

FOREIGN PATENT DOCUMENTS 54-111334 8/1979 Japan ........................... 354/217

OTHER PUBLICATIONS

Rines and Curtis, "Special Report: Underwater Imaging", M.I.T. Technology Review, Jun./Jul. 1979, pp. 14–16.
Klein and Finkelstein, "Sonar Serendipity in Loch Ness", M.I.T. Technology Review, vol. 79, No. 2, Dec. 1976, pp. 1–16.

Primary Examiner—L. T. Hix
Assistant Examiner—William B. Perkey
Attorney, Agent, or Firm—Rines and Rines, Shapiro & Shapiro

[57] ABSTRACT

This disclosure is concerned with improvements in underwater elapsed time strobe-camera apparatus and the like involving sonar-triggering by a sonar beam generated co-axially with and about the camera lens axis and, as a result of novel circuits, size-reduction and packaging, adaptability for portability, with ancillary novel features of automatic predetermination of number of pictures and indication thereof.

17 Claims, 4 Drawing Figures

APPARATUS FOR UNDERWATER IMAGE-RECORDING AS BY SONAR-TRIGGERED ELAPSED TIME STROBE PHOTOGRAPHY AND THE LIKE

The present invention relates to apparatus for image-recording, as by elapsed-time photography or other successive frame photography, particularly adapted for use underwater or in somewhat similar remote circumstances, and preferably employed with synchronously operated electron strobe light flashing or similar illumination, and preferably under the triggering control of sonar apparatus—all self-contained within the apparatus, and designed for ready portability.

While it will be evident that techniques herein described may also be used with other types of image-recording, such as television camera recording, the invention will hereinafter be described in connection with its preferred, though not exclusive, application to underwater photography. It will also be described for exemplary purposes in connection with portable use, as by vehicles, suspensions, dolphins or divers or the like, and in connection with preferred sonar triggering so long as the sonar apparatus, incorporated as an integral part of the system, indicates that desired targets only are being detected in the direction of the camera lens axis and are within the range limitations where image-recording is feasable. Such sonar control is described in earlier U.S. Pat. No. 4,105,990, issued to Robert H. Rines and Duane Marshall and assigned to the Academy of Applied Science, and is generally referred to in an article by said Rines and Howard S. Curtis appearing in the M.I.T. Technology Review of June/July 1979, pages 14-16, entitled "Special Report: Underwater Imaging".

Such earlier sonar-controlled strobe-elapsed time camera systems have required separate sonar and camera equipment and packages that have not lent themselves to ready portability or automation. The problem of incorporating acoustic transducers near housings having internal cavities that can resonate, and the difficulties in unifying structures embodying lenses and transducer arrays with comparable zones of coverage that enable a single housing to point in a particular direction with assurance that the sonar is not detecting targets materially outside the field of view of the lens optics, have been considerable. Such and other considerations, including providing for simple automatic end-of-mission indications when the desired number of pictures has been taken, (important for notifying users of this condition), and with inhibition of further elapsed time camera or strobe operation and attendant battery waste, are also admirably solved by the invention, such being more generically useful in elapsed time remote photography, and similar camera apparatus, as well.

An object of the present invention, accordingly, is to provide such a new and improved sonar-triggered strobe-camera apparatus having such novel and improved features, including ready portability.

A further object is to provide more generally improved successive image-recording apparatus, and, in particular, improved elapsed time camera apparatus.

An additional object is to automate such apparatus so that a carrier, (such as a vehicle or suspension or a diver or dolphin) need merely point at a desired target within desired range limits, and the successive flash photographing of the target will automatically proceed so long as the sonar continues to identify the desired target and to indicate such is within said range limits; and automatically cease when the desired target is lost, or the target or apparatus carrier withdraws from the desired range limits, or the desired number of pictures has been taken.

Other and further objects will be explained hereinafter and are more particularly delineated in the appended claims. In summary, however, from one of its aspects, the invention embraces a sonar-controlled image-recording system having water-tight housing means containing the sonar and image-recording apparatus, an acoustic and light transparent window provided as a wall of the housing; lens means connected with the image-recording apparatus mounted within the housing in the proximity of the said window; transducer means connected with the sonar apparatus and disposed to transmit and receive sound waves at said window, being mounted outside the field of view of the lens and shaped to have the sonar beam axis substantially co-directional with the lens axis; and control means operable when the transducer means has echoed sound waves from an underwater object in front of the said window and of predetermined characteristics and within predetermined range limits of said window within which image-recording underwater is useful, for activating the image-recording apparatus to enable recording of the same. Preferred details and best mode embodiment are hereinafter presented.

The invention will now be described with reference to the accompanying drawing, FIG. 1 of which is an isometric view of the apparatus of the invention, packaged for ready portability;

Figure 1:
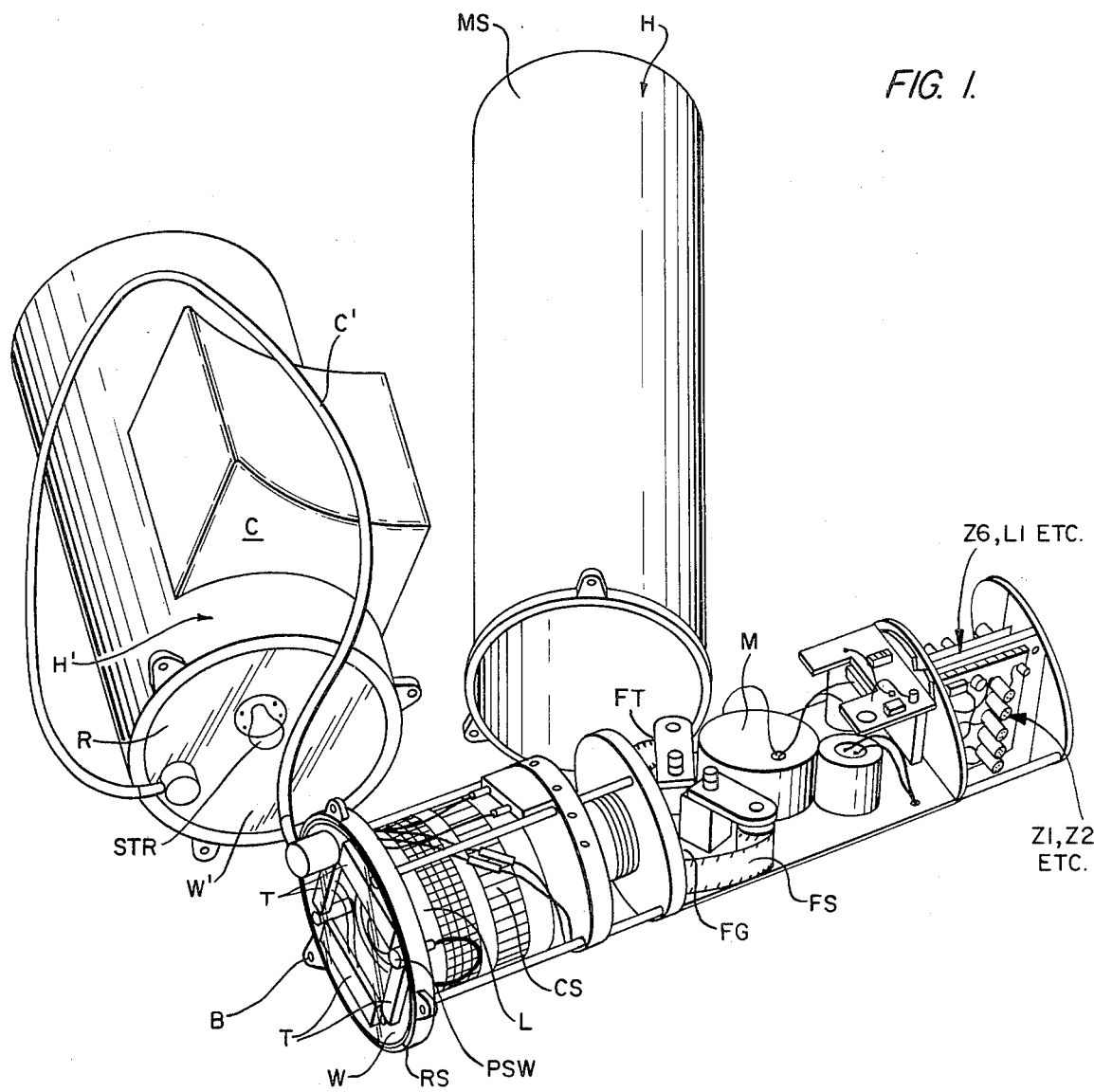

The general preferred, though exemplary, lay-out of the apparatus is shown in FIG. 1, with a sonar transducer array T (shown as four piezoelectric slabs) positioned as the four sides of a square circumscribing the camera lens L, cemented or otherwise acoustically connected to the inside surface of a plexiglass or similar acoustic and light-transparent end wall window W of the elapsed time camera housing tube H, as of aluminum. The sonar beam generated (and received) by the array T at the window W in the water surrounding the apparatus, in view of this shaping of the array T, is thus of beam axis substantially co-directional with the camera lens axis, and the transducer elements are mounted to be just outside the optical field of view of the proximal lens L. For a frequency of about 200 KHZ, piezoelectric slabs about 6 cm. long and 1.8 cm wide forming substantially a 6 cm-sided square about a Nikon 50 mm f1.4 lens (35 mm film) of underwater optical angle about 34.5°, has been found satisfactory in fresh water. The sealing of the window W to the end of the housing tube H, as by bolting at B with an interposed peripheral ring seal RS, as is well known, will provide water-tight protection for the transducer array T and its connections, as well as the elapsed time camera components (motor drive M; film supply FS, take-up FT, gate FG and shutter CS and associated circuits described in connection with the detailed diagram of FIGS. 2A and 2B), shown disposed in-line as conventional in the hereinafter-described types of underwater cameras. The sonar transmitting and receiving circuit boards (Z6, L1, etc., later detailed in FIG. 2A) and the computation circuit boards for setting the desired target characteristics, range limitations, etc. for operation of the camera (Z1, Z2, etc., also full described in connection with FIGS. 2A and 2B) are also disposed rearwardly within the water-tight housing, with acoustic resonance inhibited by adjustment of location and by housing damping as by adhesive tape sections AT on the housing.

As hereinafter described, more particularly in connection with FIG. 2A, if a pressure switch (labelled "PRESS SW" therein) is to be used to prevent actuation above a certain water depth, the water pressure inlet conduit may be sealed in the window W as at PSW in FIG. 1.

Figure 3:
FIG. 3 is a view showing the equipment of the invention portably carried by a dolphin.

The similar strobe light housing H' is also shown in FIG. 1, as of the types described in said Letters Patent and/or of the E G & G Geodyne Type 206, and/or described in an article entitled "Loch Ness and Underwater Photography" by Charles W. Wyckoff appearing at p. 8-9 of the MIT Technology Review, December, 1976, "Sonar Serendipity in Loch Ness". The strobe lamp STR is shown exposed through a parabolic reflector R behind the end window W'. A shaped cushion C as of rubber or the like is shown mounted upon the housing H', and may also be used upon the housing H to assist in harnessing the equipment around a dolphin, for example, with a harness strap H'''shown attached around the body and housings in FIG. 3, such that the housing H and H' are on either side thereof, rearward of the eyes, and pointing in the direction of travel of the dolphin. The interconnecting synchronizing cable between the housings is shown at C'in FIG. 1.

It is now in order to describe the details of the apparatus of the invention in a best mode embodiment.

Figure 2A:
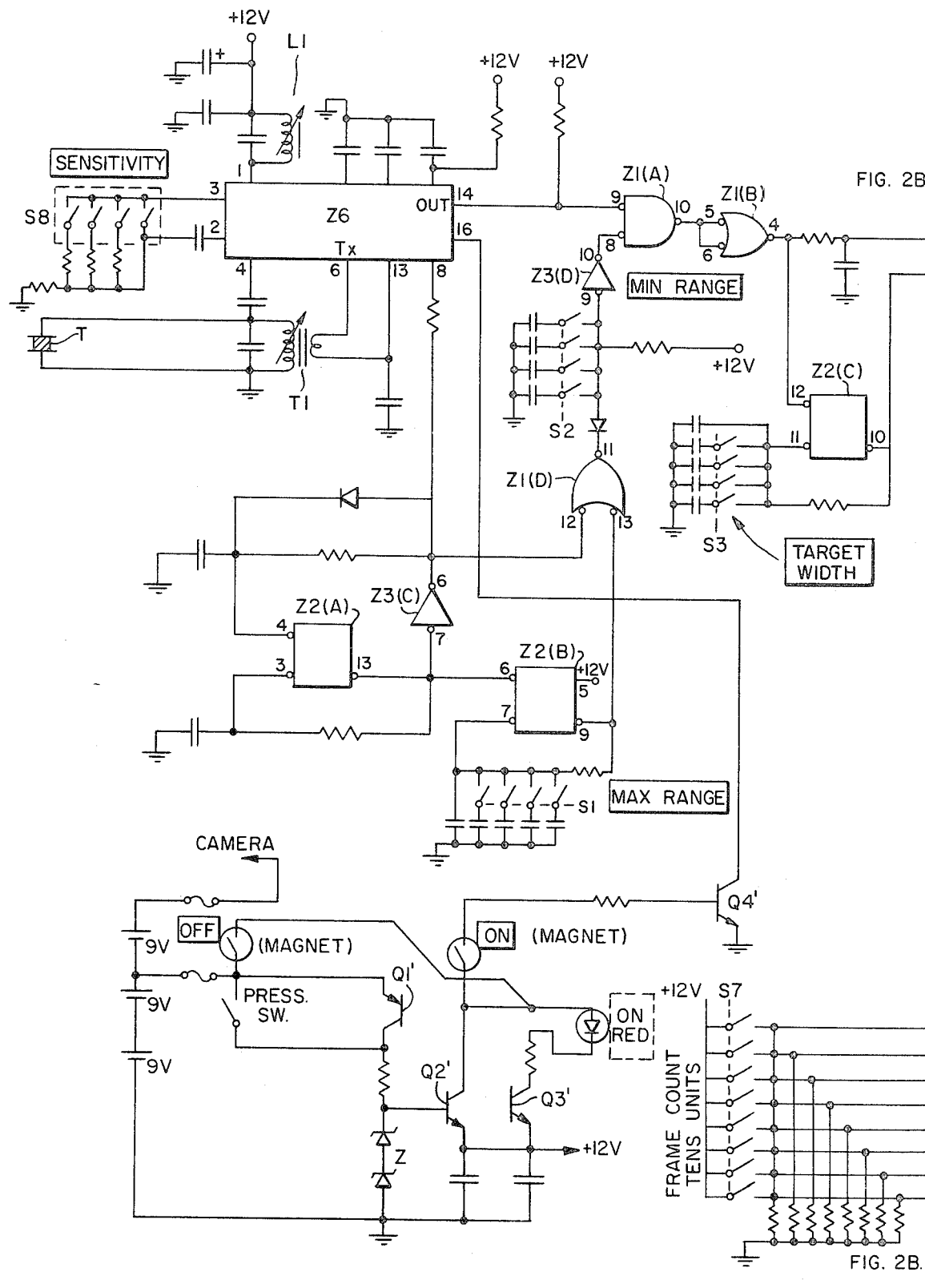
FIGS. 2A and 2B are a circuit diagram of the preferred apparatus.
Figure 2B:
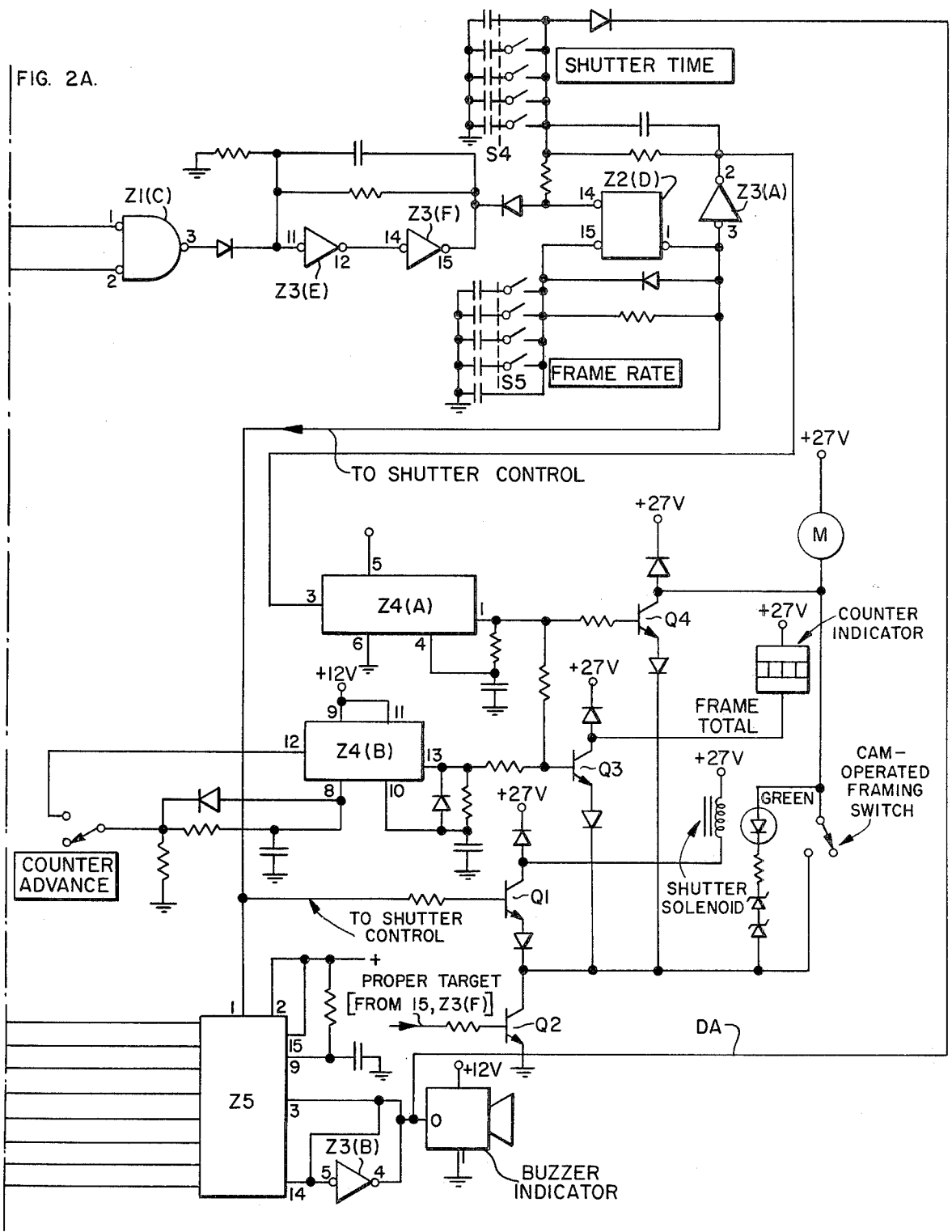

Referring to the exemplary circuit diagram of FIGS. 2A and 2B, the piezoelectric transducer array is illustrated at the upper left at T in FIG. 2A, connected across a tuned circuit T1 driven from a class C amplifier section of a sonar transceiver integrated circuit Z6 (pins 4-6 thereof, labelled "Tx") cooperative with tank circuit L1 (pin-1) to generate the transmitted sonar pulse under the pulsing control of a free-running multivibrator section of a "quad-latch" integrated circuit Z2(A). The stages Z6 may, as an example, be of the National Semiconductor type LM1812. The integrated circuit Z2 may, for example, be of the RCA type CD4044-AB, generating in the quarter section Z2(A) a pulse of the order of a millisecond, as an illustration, to drive the before-mentioned class C driven section of Z6. When Z2(A) shuts off, the sonar echoes received at T are applied at pin 4 of Z6 and, using the same tank circuit L1 that generated the transmitted pulses, are amplified in the stages of Z6, with inter-stage networks S8, etc. selectable to set the sensitivity of the receiver portion of the sonar transceiver, as is well known.

As explained in said prior Letters Patent of Rines and Marshall, it is desired that only sonar target signals having predetermined characteristics (as from the right size or width target, for example) and within certain ranges (such as those within strobe-camera photographic effectiveness), cause the activation of the image-recording system. In searching for underwater animals of certain size, and in water with photographic range limitations, for example, as in researches at Loch Ness, Scotland (where the equipment may be suspended from the surface to monitor underwater animal life, or it may be carried by dolphins or other carriers as in FIG. 3 to seek out such life), or in other applications such as inspecting particular man-made or other objects, including rigs and pipelines under the sea, and/or archaeological objects, it is desirable to conserve the energy of the strobe or other lighting or illumination system and/or the recording film, tape or other medium, for use only when the sonar has detected the desired object(s) and the apparatus is within appropriate ranges and orientations with respect to the same. Stages Z1(A) through (D) in FIGS. 2A and 2B enable these results in the same manner described in said Letters Patent, Z1 comprising a quad "nor" gate as of the RCA type 4001, for example. Section Z1(A), pins 8-9-10, fed from the output "OUT" of Z6 (pin 14), gates the maximum range signal to prohibit target signals greater than the predetermined maximum effective range, as presently explained. Section Z1(B) at pins 4, 5 and 6 is an inverter to obtain proper polarity for the later-described target width control at Z2 (C), determining what minimal width dimension characteristic of the target is desired in the search. Pins 1, 2 and 3 of section Z1 (c), FIG. 2B, are the terminals of the target width gate output (pin 10) of Z2(C); and Z1(D) of FIG. 2A at pins 11, 12 and 13, serves to mix the sonar pulse width generated in Z2(A) and the maximum range one-shot from pin 9 of section Z2(B) for both maximum and minimum range control. Switches S2 ("MIN. RANGE") enable selection of an appropriate RC delay recovery of the output of Z1(D), pins 11-12-13, to control the minimum range time allowable. Switches S1 ("MAX RANGE") similarly enable appropriate time-constant selection for Z2(B) to control the maximum range. And in like manner, switches S3 ("TARGET WIDTH") enable selection of the predetermined desired target echo minimum width for activation of the gate Z1(C), FIG. 2B.

Various sections of a hex-inverter Z3 (Z3(A) through (F)), such as of the RCA type 4049, are used for inversion purposes, including Z3(C), pins 6 and 7, between the output pin 13 of Z2(A) and the input pin 12 of Z1(D); and Z3(D), pins 9 and 10, between the output pin 11 of Z1(D) and the input pin 8 of Z1(A). Two other sections of Z3, namely Z3(E) at pins 11 and 12, and Z3(F) at pins 14 and 15 (upper right of FIG. 2B), are shown connected to operate as a Schmidt trigger circuit with delayed turn-off and turn-on rise time in response to the output fed from pin 3 of the gate Z1(C) through a diode, that aids in decreasing of false signal triggering and prolongs the later-described camera motor turn-off after the last "shot" of the trigger circuit when the target is no longer at the desired range. This is effected by applying the output at Z3(F) pin 15 through a diode to pin 14 of section Z2(D) that operates as a free-running multivibrator (pins 14, 15 and 1) when permitted by the Schmidt trigger circuit, so that one phase or mode of its timing cycle determines the camera shutter time and the other complementary phase establishes the film frame rate. The elapsed time camera controls may be of the type described and referenced in said Letters Patent, as of the Geodyne Types 204, 204B of E G & G, Wellesley, Massachusetts, or the 35 mm underwater cameras of Benthos Inc. of Falmouth, Massachusetts, described in said Wyckoff article, or any other well-known conventional type.

The further inverter section Z3(A), pins 2-3, aids the free-running characteristics by artificially re-creating the complementary mode. When a qualified target has been detected, therefore, two outputs result from Z2(D). The "Q" output at pin 1 of Z2(D), FIG. 2B, is used to control the camera shutter drive and comprises transistor $Q_1$ (fed via conductor labelled "TO SHUT- TER" from pin 2 of Z3(A)) and its associated diode-resistor network. When the "Q" output rises, Q, conducts and its collector passes current through the "SHUTTER SOLENOID". The complementary "Q" output at pin 2 feeds a dual flip-flop Z4(A), pins 3 through 6 and 1. This section Z4(A) is triggered as a one-shot, driving the camera motor driver transistor stage Q4 (such as, for example, a Motorola type MPS045) to operate the camera motor M to advance the film in conventional elapsed time camera fashion. The one-shot operation allows sufficient time for rotation of a cam that activates the "FRAMING SWITCH", so-labelled, (which can synchronously control the strobe flash or other illumination, as explained in said Letters Patent), to open up the motor circuit at the end of the frame. The variable capacitive time-constant selections available by switches S4 and S5 connected with multi-vibrator Z2(D) permit selection of shutter timing and frame rate.

A frame count may be desired to indicate the number of pictures taken of the sonar-detected target of appropriate characteristics and range. In applying the equipment of the present invention to the mounting of the same upon dolphins or other carriers, the automatic signalling that the required number of strobe-pictures has been taken to order return to the surface, is desirable and will later be described; but in other applications, also, such a frame counting may be required or useful. A visual frame counter, labelled "FRAME TOTAL COUNTER INDICATOR" (lower right of FIG. 2B) is shown driven by transistor Q3 either by Z4(A) or by a switch-controlled free-running multi-vibrator section Z4(B), pins 8-13, to allow manual advancement or setting of the frame counter by depressing a switch labelled "COUNTER ADVANCE" connected with pins 8 and 12 of Z4(B)—the multivibrator running to generate counter indicator controlling impulses while the switch is depressed to advance the counter until release of the switch. This is useful when re-setting the apparatus after use or test.

All of the shutter drive transistor $Q_1$, the frame totalizer transistor $Q_3$ and the motor pulser transistor $Q_4$ are shown returned to ground (or chassis potential) through a further transistor $Q_2$ which only turns on when the appropriate target is detected by the sonar, because it is pre-gated by the output of Pin 15 of Z3(F).

Another feature of the design of the invention, appropriate far more broadly than in the illustrative equipment, uses before discussed, is automatically preventing or inhibiting further camera motor operation and film advancement and shutter operation when the desired number of pictures has been taken—thus to prevent battery or other energy source useless run-down, including the energy of the strobe or illumination system where used, as well. This is shown effected by the application of another "Q" output from pin 3 of Z3(A) to pin 1 of an electronic counter Z5, of the presettable dual-decade down-count type, with the aid of switches S7, such as RCA type 40102. Each clock pulse representing a shutter operation applied at pin 1 of Z5, will increment the counter downwards so that when it reaches 0, its carry output at pin 14, drops in voltage. Inverter section Z3(B), pins 4 and 5, will invert this and provide an output to disable the framing multivibrator Z2(D), via conductor DA, eliminating further shutter pulses and film advancement and strobe or other illumination flashing. For indicating purposes, such as alerting the dolphin or other carrier, the output of Z3(B) may be fed to an alerting indicator, shown as an audible buzzer, so labelled, to indicate that the desired number of photographs has been taken.

It is useful to simulate the detection and verification of suitable targets to test and calibrate the apparatus. This can also be useful to effect from outside the water-tight housings of the apparatus. At the bottom left of FIG. 2A are shown circuits for achieving these ends. Transistors $Q_1'$ and $Q_2'$ are shown connected to function in a regenerative loop analogously to an SCR switch. The pair of zener diodes Z connected to the base $Q_2'$ provide regulated output at its emitter. Power from a pair of 9-volt batteries provides regulated 12 volts when $Q_1'$-$Q_2'$ latch on. By applying a magnet to the spot of the "ON" magnetic switch (MS in FIG. 1, from outside an aluminum or other suitable housing H) trickle current through $Q_4'$ will act as a simulated appropriate target received by the sonar Z6, and will continue to simulate the target so long as the magnet is positioned near the "ON" switch. Applying the magnet to the region of the "OFF" magnetic switch, moreover, will cause current to flow through $Q_1'$ and open up $Q_1'$-$Q_2'$.

To avoid spurious turn-on in operation as from inadvertent sonar-triggering on the water surface or from the hull of a vessel or the like, the apparatus may be rendered incapable of operation until a pressure switch, labelled "PRESS SW", connecting the +18 volts directly to the collector of $Q_1'$ and making it unnecessary to use the regenerative section of $Q_1'$-$Q_2'$, is actuated at a desired minimum depth. This is important in the before-mentioned dolphin or related operations; and the required depth of arming of the apparatus can be set outside the maximum range setting to avoid such undesired operation of the apparatus.

Indicator lamps demonstrating that all circuits are operating satisfactorily are also provided; the "ON-RED" indicator being driven by $Q_3'$, and a "GREEN" indicator (far right and bottom of FIG. 2B), indicating when the camera motor is driven—a dimming of which is a sign of a drop in motor voltage.

Clearly parts of the invention are useful more generally in elapsed time and similar image recording, as where, for example, the feature is desired of inhibiting further camera motor and strobe operation after a predetermined number of frames has been advanced, altogether apart from producing signal indications thereof, etc.; and further modifications will also occur to those skilled in this art—such being considered to fall within the spirit and scope of the invention as defined in the appended claims.

What is claimed is:

1. In a sonar-controlled image-recording apparatus having water-tight housing means containing the sonar and image-recording apparatus, an acoustic and light transparent window provided as a wall of the housing; lens means connected with the image-recording apparatus mounted within the housing in proximity to said window; transducer means connected with the sonar apparatus and disposed to transmit and receive sound waves at said window, being mounted outside a field of view of the lens means and shaped to have a sonar beam axis substantially co-directional with an axis of the lens means; and control means operable, when the transducer means receives echoed sound waves from an underwater object in front of the said window and of predetermined characteristics and within predetermined range limits of said window within which image-recording underwater is useful, for activating the image-recording apparatus to enable recording of the underwater object.

2. Apparatus as claimed in claim 1 and in which said transducer means is disposed within said housing means and in acoustic contact with said window.

3. Apparatus as claimed in claim 1 and in which said image-recording apparatus is camera apparatus, and said control means activates a shutter of the camera apparatus.

4. Apparatus as claimed in claim 3 and in which harnessing means is provided proportioned for attachment around an animal such as a dolphin.

5. Apparatus as claimed in claim 3 and in which means is provided, activable externally to said housing for initiating a test activation of said shutter independently of sonar detection and for arming said apparatus for subsequent sonar-controlled activation of said shutter.

6. Apparatus as claimed in claim 3 and in which means is provided for producing successive electrical impulses corresponding to successive desired frames of film while said object is detected by the sonar apparatus; film-drive motor means within the housing means connected to respond to said impulses and correspondingly to advance the film successive frames; said shutter being provided with control means operable to activate the shutter for each frame advancement; counter means having means for pre-setting a predetermined number of counts corresponding to a selected number of shutter operations and thus shutter-exposed frames; means for actuating said counter means for each impulse during the sonar apparatus detection of said object until the selected number of counts has been achieved; and means for thereupon inhibiting the film-drive motor means and shutter operation.

7. Apparatus as claimed in claim 3 and in which strobe light means is provided oriented to illuminate the region in front of said window and connected with the said control means and operable upon the sonar detection of said object for transmitting a flash of light to the object while the camera shutter is open.

8. Apparatus as claimed in claim 7 and in which the strobe light means is mounted in housing means similar to the sonar-controlled camera system housing means, and in which there is provided carrying means for carrying the two housing means underwater in spaced lateral position.

9. Apparatus as claimed in claim 8 and in which said carrying means comprises harnessing means for attachment to means for propelling the laterally spaced sonar-controlled camera system housing means and strobe light means housing means through the water.

10. Apparatus as claimed in claim 7 and in which means is provided for repetitively activating said shutter and advancing film in the camera apparatus so long as said object of predetermined characteristics is being detected by the sonar apparatus.

11. Apparatus as claimed in claim 10 and in which counting and indicating means is provided for counting a number of activations of said shutter and producing an indication when a predetermined number of pictures has been taken by the camera apparatus.

12. Apparatus as claimed in claim 11 and in which said indication is an acoustic signal emanating from said housing means.

13. Apparatus as claimed in claim 11 and in which means is provided operable upon the counting of said predetermined number of pictures, for thereupon inhibiting further shutter activation and film advancement.

14. In motor-driven successive frame camera apparatus and the like, means for producing successive electrical impulses corresponding to successive desired frames of film; film-drive motor means connected to respond to said impulses and correspondingly to advance the film successive frames; a shutter operable for each frame advancement; counter means having means for presetting a predetermined number of counts corresponding to a selected number of shutter operations and frames; means for actuating said counter means for each impulse until the selected number of counts has been achieved; means for thereupon inhibiting the film-drive motor means and shutter operation; means for producing and receiving a sonar beam substantially coaxial with an axis of a lens of said camera apparatus to detect a desired target to be photographed; and means responsive to sonar detection of the desired target for enabling said film-drive and shutter operation.

15. Motor-driven successive frame camera apparatus as claimed in claim 14, having electronic strobe means; means actuated as successive shutter operations are effected for triggering the strobe means to produce synchronously a flash of light for each frame; said inhibiting means also preventing further triggering of the strobe means.

16. Motor-driven successive frame camera apparatus as claimed in claim 14, and in which said counter means comprises an electronic down-count counter having means for setting said predetermined count number and means responsive to each impulse representing a shutter operation to increment said counter downwards; and said disabling means is responsive to complete downward incrementing of the counter according to said predetermined number.

17. Motor-driven successive frame camera apparatus as claimed in claim 14, and in which means for generating impulses similar to frame-advancing impulses is provided, operable by switch actuation to provide for the setting of a counter indicator means.

* * * * *